United States Patent

Tamura et al.

Patent Number: 6,005,492
Date of Patent: Dec. 21, 1999

[54] ROAD LANE RECOGNIZING APPARATUS

[75] Inventors: Kazuya Tamura; Sachio Kobayashi; Eishi Jitsukata, all of Wako, Japan

[73] Assignee: Honda Giken Kogyo Kabushiki Kaisha, Tokyo, Japan

[21] Appl. No.: 09/108,320

[22] Filed: Jul. 1, 1998

[30] Foreign Application Priority Data

Aug. 21, 1997 [JP] Japan .................................. 9-224749

[51] Int. Cl.$^6$ ................................................. G08G 1/017
[52] U.S. Cl. ........................ 340/937; 340/988; 340/435; 340/436; 348/118; 348/119; 348/169; 701/28; 701/301; 180/169; 382/181; 382/291
[58] Field of Search .................................. 340/937, 901, 340/903, 933, 939, 188, 435, 436, 439; 348/118, 119, 169; 701/28, 207, 213, 301, 300; 180/169, 167, 168; 318/580; 382/181, 103, 104, 291

[56] References Cited

U.S. PATENT DOCUMENTS

| | | | |
|---|---|---|---|
| 4,970,653 | 11/1990 | Kenue | 701/301 |
| 5,208,750 | 5/1993 | Kurami et al. | 701/28 |
| 5,301,115 | 4/1994 | Nouso | 701/300 |
| 5,351,044 | 9/1994 | Mathur et al. | 340/901 |
| 5,379,353 | 1/1995 | Hasegawa et al. | 382/41 |
| 5,517,412 | 5/1996 | Unoura | 701/23 |
| 5,555,312 | 9/1996 | Shima et al. | 382/104 |
| 5,617,085 | 4/1997 | Tsutsumi et al. | 340/903 |
| 5,642,093 | 6/1997 | Kinoshita et al. | 340/439 |
| 5,661,472 | 8/1997 | Koshizawa | 340/901 |
| 5,684,697 | 11/1997 | Mullen | 701/28 |
| 5,765,116 | 6/1998 | Wilson-Jones et al. | 701/41 |
| 5,790,403 | 8/1998 | Nakayama | 701/28 |
| 5,892,855 | 4/1999 | Kakinami et al. | 382/291 |
| 5,913,375 | 6/1999 | Nishikawa | 180/168 |
| 5,926,126 | 7/1999 | Engelman | 342/70 |

*Primary Examiner*—Benjamin C. Lee
*Attorney, Agent, or Firm*—Nikaido, Marmelstein, Murray & Oram LLP

[57] ABSTRACT

A road lane recognizing apparatus can accurately recognize a road lane position from an image shown by an actual road surface image signal obtained by picturing a road surface in front of a vehicle by means of picturing means such as a television camera or the like mounted on the vehicle. Whether the vehicle exists on a straight part of road or not is discriminated in accordance with a vehicle-self position detected by vehicle detecting means. When the vehicle exists on the straight part, an attitude angle showing the direction of the vehicle for the road direction at the vehicle-self position is detected. When the attitude angle is detected, a predetermined ideal road surface image is inclined by only the attitude angle, thereby obtaining the corrected road surface image. The actual road surface image signal from the picturing means is compared with a signal of the corrected road surface image. An image difference is used as an offset amount. The actual road surface image is corrected by only the offset amount. The road lane position is recognized on the basis of the image shown by the corrected actual road surface image signal.

1 Claim, 3 Drawing Sheets

ROAD LANE RECOGNIZING APPARATUS

BACKGROUND OF THE INVENTION

1. Field of the Invention

The present invention relates to a road lane recognizing apparatus for recognizing a lane defined by white lines appearing in a road surface image represented by an actual image signal obtained through a picturing means such as a picture and camera or the like mounted on a vehicle for picturing a road surface before the vehicle.

2. Description of the Related Background Art

A steering control system is disclosed in, for example, JP-A-5-334595 which system enables a motor vehicle to automatically cruise while its steering is controlled on the basis of an image signal obtained by a television camera mounted on the front part of the vehicle. In such steering control system, an image of a road surface in front of the vehicle is usually obtained by the television camera, white lines being detected from the obtained image by a lane recognizing apparatus. The current vehicle-self position is detected by a vehicle-self position detecting means such as a device using the GPS (Global Positioning System) or the like. A steering amount of the steering is calculated on the basis of the current vehicle-self position on the lane defined by the white lines, and a steering actuator is driven in accordance with the calculated steering amount.

In the steering control system, the steering is controlled depending on the road surface image obtained by the television camera, as mentioned above. When, therefore, the television camera is incorrectly mounted on the vehicle or, otherwise, there is an inclination (roll) in the vehicle, such a problem should occur that the road surface image is inclined and the white line position, that is, a road lane cannot be accurately recognized because of the inclination of the road surface image. Consequently, there is uncertainty in positional relation of the recognized position and attitude of the vehicle relative to the lane and, therefore, a steering control amount cannot be accurately calculated and it is difficult to control the vehicle cruising, as desired.

SUMMARY AND OBJECTS OF THE INVENTION

It is, therefore, an object of the invention to provide a road lane recognizing apparatus which can accurately recognize a lane position from an image represented by an actual road surface image signal produced from a picture means for picturing a road surface in front of a vehicle such as a television camera or the like mounted on the front part of a vehicle.

A road lane recognizing apparatus for recognizing a road lane according to the present invention on the basis of an image of a road surface in front of a vehicle comprises: current vehicle-self position detecting means for detecting a current position of the vehicle; straight road detecting means for discriminating that the vehicle exists on a straight road on the basis of the current vehicle-self position detected by the current vehicle-self position detecting means; attitude angle detecting means for detecting an attitude angle indicative of a direction of the vehicle relative to a road direction at the current vehicle-self position when the existence of the vehicle at a straight road is detected by the straight road detecting means; correction processing means for generating a correction image signal representing an image which is inclined from a predetermined ideal image by only the attitude angle detected by the attitude angle detecting means; picturing means mounted on the vehicle for picturing a road surface in front of the vehicle and generating an actual image signal representing the road surface image; offset detecting means for comparing the actual image signal with the correction image signal when the correction image signal is generated by the correction processing means and for generating and holding an image difference therebetween as an offset amount; correcting means for correcting the actual image signal only by the held offset amount; and road lane recognizing means for recognizing a road lane position on the basis of an image shown by the actual image signal corrected by the correcting means.

Even if, therefore, the picturing means mounted on the vehicle is inclined, it is possible to obtain a corrected road surface image signal by eliminating the inclination amount from the actual road surface image signal representing an image in front of the vehicle which signal produced from the picturing means. By using the corrected actual road surface image signal processed as mentioned above, the road lane position can be accurately recognized.

DETAILED DESCRIPTION OF THE PREFERRED EMBODIMENT

Figure 1:
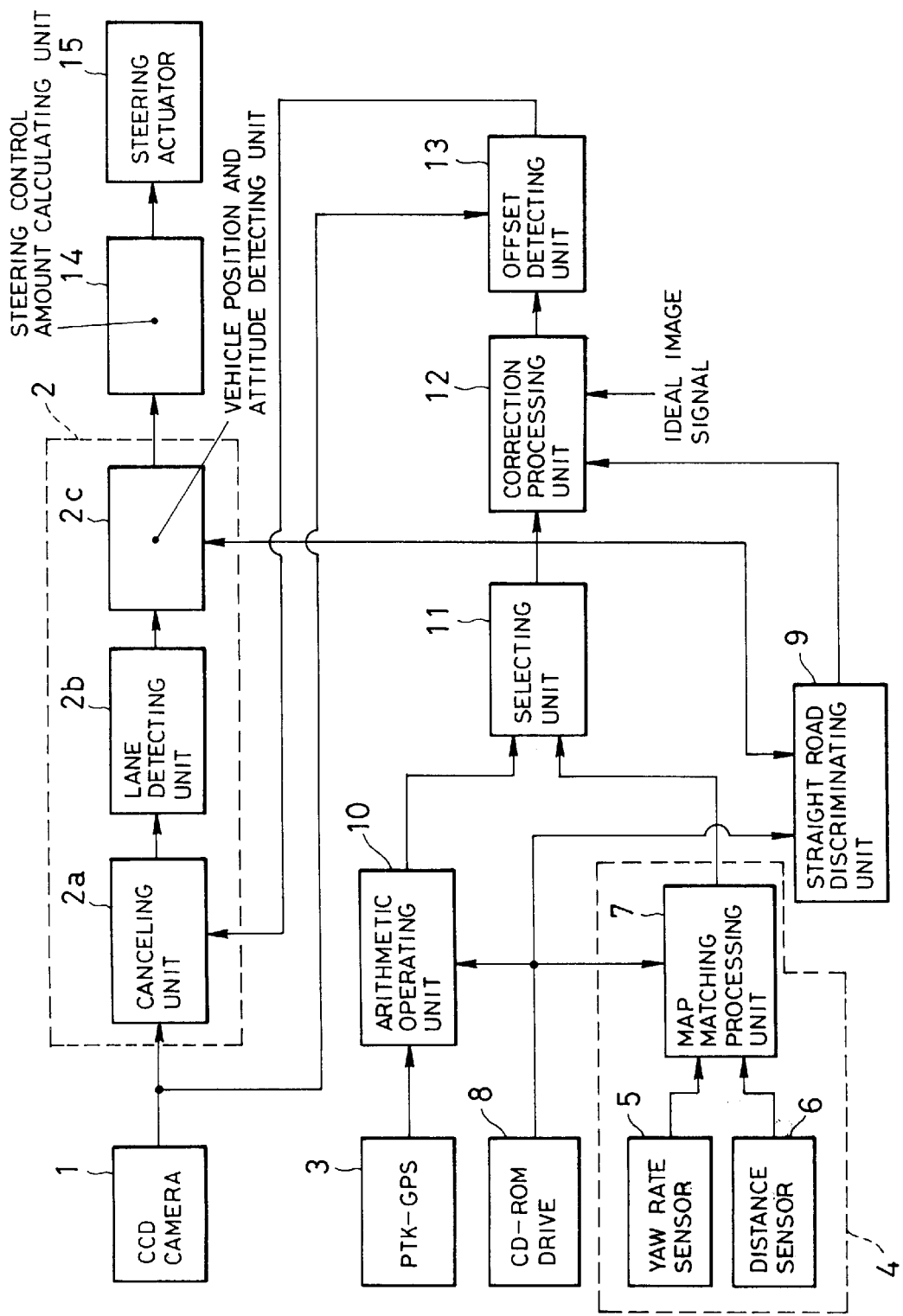
FIG. 1 is a block diagram showing an embodiment of the present invention.

An embodiment of the invention will be described in detail hereinbelow while referring to the drawings.

FIG. 1 shows a steering control system as an embodiment of the invention. In the steering control system, a CCD (Charge Coupled Device) camera 1 serving as picturing means is mounted at a front portion of a vehicle so that a road surface in front of the vehicle can be pictured. An image signal obtained by the CCD camera 1 is supplied to an image processing unit 2. The image processing unit 2 includes a canceling unit 2a serving as correcting means for eliminating an offset amount from the image signal produced from the CCD camera 1. A road lane detecting unit 2b serves as road lane recognizing means for detecting a road lane by executing a white line detecting process to recognize white lines on the basis of an output image signal of the canceling unit 2a. A vehicle-self position and attitude detecting unit 2c recognizes a vehicle-self position on the road lane and detects an attitude of the vehicle with respect to the road lane (angle between the road lane longitudinal direction and the direction of the vehicle).

A steering control amount calculating unit 14 constituted by a microcomputer is connected to an output of the image processing unit 2. The steering control amount calculating unit 14 calculates steering control amounts i.e. a steering amount and a steering speed on the basis of the vehicle-self position and the attitude of the vehicle with respect to the road lane which are supplied by the image processing unit 2 so as to drive a steering actuator 15.

An RTK-GPS (Real Time Kinematic-Global Positioning System) 3 receives radio waves from a plurality of artificial satellites via a plurality of antennas mounted on a vehicle and extracts from the received radio waves latitude and lingitude information so as to obtain absolute three-dimensional coordinate position data of the vehicle. An inertial navigation system 4 comprises a yaw rate sensor 5, a distance sensor 6, and a map matching processing unit 7. The yaw rate sensor 5 detects an angular velocity of the vehicle and the distance sensor 6 detects a mileage of the vehicle. The map matching processing unit 7 detects a running locus through which the vehicle has cruised, in accordance with an azimuth obtained by integrating the angular velocity of the vehicle detected by the yaw rate sensor 5 and adding the resultant data and the mileage of the vehicle detected by the distance sensor 6. Further, the map matching processing unit 7 calculates the current vehicle-self position and the current attitude angle of the vehicle from map data read from a CD-ROM drive 8 on the basis of the detected running locus. When the self vehicle-self position on a road is obtained by the map matching, an inclination of the road at the current vehicle-self position is known from the map data. An angle of the fore-aft direction of the vehicle on the road is calculated as an attitude angle on the basis of the difference between an output value of the yaw rate sensor 5 at the current vehicle-self position and the inclination of the road. The CD-ROM drive 8 drives a CD-ROM (not shown) in which map data has been recorded and reads out the recorded map data.

A straight road discriminating unit 9 serving as straight road detecting means is connected to an output of the CD-ROM drive 8. The straight road discriminating unit 9 discriminates that the current vehicle-self position of the vehicle is on a straight road in view of the map data.

On the other hand, the RTK-GPS 3 has an arithmetic operating unit 10 for calculating the vehicle-self position and the current attitude angle of the vehicle by using a plurality of three-dimensional coordinate position data and the output map data of the CD-ROM drive 8. The arithmetic operating unit 10 supplies the current vehicle-self position and the current attitude angle of the vehicle to a selecting unit 11.

The RTK-GPS 3, the inertial navigation system 4, and the arithmetic operating unit 10 cooperate with each other so as to form vehicle-self position detecting means. The map matching processing unit 7 and the arithmetic operating unit 10 correspond to the attitude angle detecting means.

Outputs of the map matching processing unit 7 and the arithmetic operating unit 10 are supplied to the selecting unit 11. The selecting unit 11 discriminates whether the data of the vehicle-self position and the attitude angle supplied from the map matching processing unit 7 and arithmetic operating unit 10 has continuity or not, and generates either one of the attitude angle data in accordance with the discrimination result. The vehicle-self position and the attitude angle of the vehicle as calculation outputs from the arithmetic operating unit 10 are obtained, for example, every 0.1 second and those data cannot be calculated as long as the vehicle exists within a tunnel. Since a rate of acquisition of those data from the arithmetic operating unit 10 per unit time is, smaller than those of the vehicle-self position and the attitude angle of the vehicle which are obtained from the map matching processing unit 7, the selecting unit 11 employs the self vehicle-self position and the attitude angle of the vehicle from the arithmetic operating unit 10 only when the arithmetic operating unit 10 produces those data. The selecting unit 11 employs the self vehicle-self position and he attitude angle of the vehicle which are obtained from the map matching processing unit 7 in other cases than the issuance of data by unit 10.

A correction processing unit 12 for receiving attitude angle data is connected to an output of the selecting unit 11. When it is discriminated by the straight road discriminating unit 9 that the current vehicle-self position of the vehicle is on a straight road, the correction processing unit 12 corrects ideal image data by the attitude angle data from the map matching processing unit 7 or the arithmetic operating unit 10 which is selected and transferred by the selecting unit 11. The ideal image data supplied to the correction processing unit 12 shows an ideal road surface image on the straight road. An offset detecting unit 13 is connected to an output of the correction processing unit 12 and the offset detecting unit 13 detects an offset amount by comparing an image shown by an image signal obtained by the CCD camera 1 with a corrected ideal image. The offset amount is supplied to the image processing unit 2. The correction processing unit 12 corresponds to the correction processing means and the offset detecting unit 13 corresponds to the offset detecting means.

In the steering control system with the above-mentioned arrangement, the offset amount can be detected only when the vehicle exists on a straight road. For this purpose, the straight road discriminating unit 9 receives the current vehicle-self position data supplied from the map matching processing unit 7 or arithmetic operating unit 10 via the selecting unit 11 and determines that the vehicle travels on the straight road on the basis of the map data of the current vehicle-self position read out from the CD-ROM by means of the CD-ROM drive 8. When, for example, a curvature obtained from three map nodes at three consecutive points on the road specified by the current vehicle-self position data is equal to or smaller than a predetermined threshold value, it is determined that the vehicle is travelling or exists at a straight part of road.

When the straight road discriminating unit 9 discriminates that the vehicle exists at a straight part of a road, the straight road determination result is supplied to the correction processing unit 12.

Figure 2:
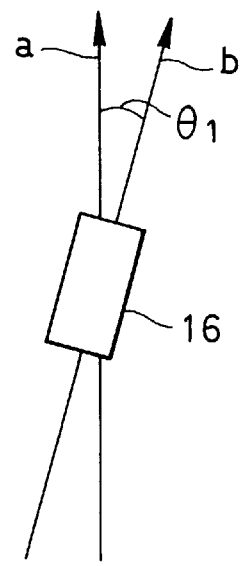
FIG. 2 is a diagram showing an attitude angle.

In the map matching processing unit 7, the current vehicle-self position and an attitude angle $\theta 1$ at the straight road are obtained by a known method on the basis of sensor outputs of the yaw rate sensor 5 and distance sensor 6. As shown in FIG. 2, the attitude angle $\theta 1$ is an angle between the longitudinal direction (a) of the straight road and the fore and aft direction (b) of a vehicle 16.

Figure 3:
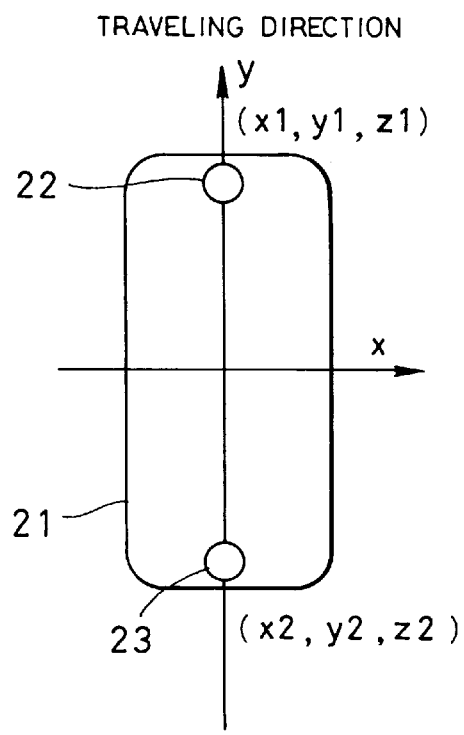
FIG. 3 is a diagram showing an attaching position of an antenna of an RTK-GPS.

On the other hand, in the arithmetic operating unit 10, 3-dimensional coordinate data indicative of the attaching position of each antenna of the vehicle is supplied from the RTK-GPS 3. It is assumed here that, as shown in FIG. 3, a travelling direction of a vehicle 21 is made to be the y axis, a direction perpendicular to the y axis in the horizontal plane is made to be the x axis, and antennas 22 and 23 are attached in the front and rear portions of the vehicle along the y axis. An axis perpendicular to the x and y axes is the z axis (not shown). In the RTK-GPS 3, 3-dimensional coordinate position data obtained from the antenna 22 is labeled as (x1, y1, z1) and 3-dimensional coordinate position data obtained from the antenna 23 is labeled as (x2, y2, z2). The current vehicle-self position (Xv, Yv, Zv) of the vehicle is calculated by the following equation.

$$(Xv, Yv, Zv) = \{(x1+x2)/2, (y1+y2)/2, (z1+z2)/2\}$$

The attitude angle $\theta 1$ in the traveling direction of the vehicle with respect to the longitudinal direction of the road is calculated by the following equation.

$$\theta1 = \text{ATAN}\{(y2-y1)/(x2-x1)\}$$

where, ATAN denotes arctangent.

Actually, a pitching angle in the YZ plane and a roll angle in the ZX plane can be calculated as an attitude angle of the vehicle in a manner similar to the attitude angle in the travelling direction.

The vehicle-self position and the attitude angle θ1 calculated by the map matching processing unit 7 and arithmetic operating unit 10 are supplied to the selecting unit 11, respectively. The selecting unit 11 obtains the running locus formed by the respective vehicle-self positions. When a difference between a vehicle-self position predictable on the basis of the running locus and a newly supplied vehicle-self position is within a permissible range, the selecting unit 11 determines that there is continuity. When it is determined that there is continuity, the selecting unit 11 supplies the attitude angle θ1 obtained from the output having the continuity of either the map matching processing unit 7 or the arithmetic operating unit 10 to the correction processing unit 12.

In the correction processing unit 12, when the straight road discriminating unit 9 determines that the vehicle exists at the straight road, the attitude angle θ1 is used to correct the road surface image shown by the ideal image data to an image in the direction of the vehicle, that is, an image obtained when it is seen from the CCD camera 1. For example, an arrangement conversion of each pixel data of the ideal image data is performed in order to move the white line of the road lane in the road surface image shown by the ideal image data to the right or left by only the number of pixels corresponding to the attitude angle θ1.

Figure 4A:
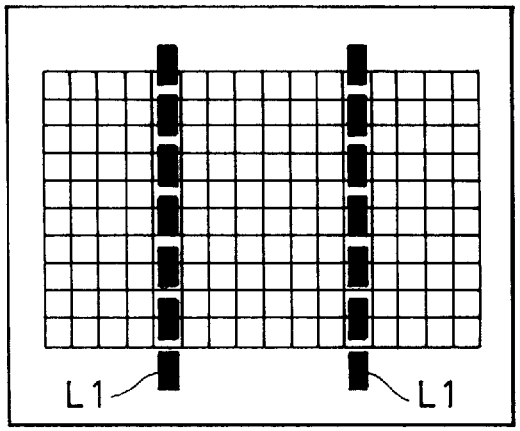
FIGS. 4A to 4E are diagrams for explaining the offset detecting operation.
Figure 4B:
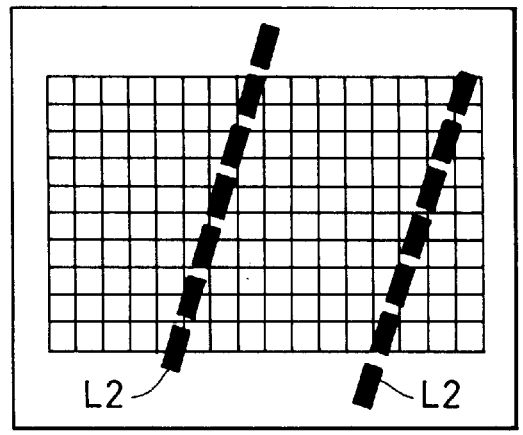
Figure 4C:
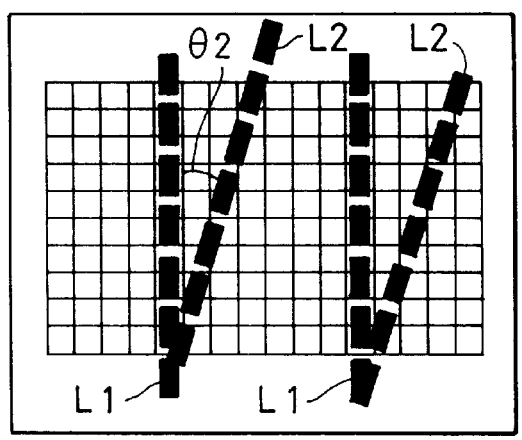
Figure 4D:
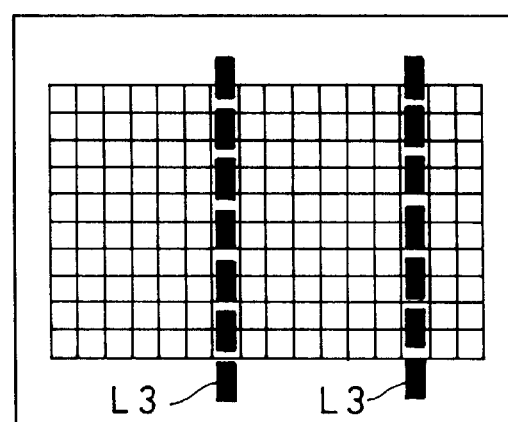
Figure 4E:
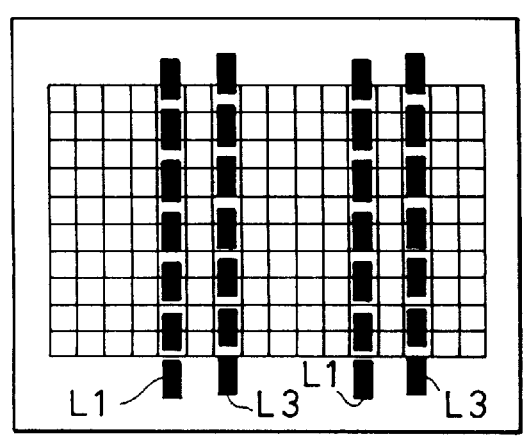

In the offset detecting unit 13, by comparing the ideal image of the ideal image data corrected as mentioned above with an actual image shown by the present image signal generated from the CCD camera 1, an offset amount is calculated. For example, it is assumed that the corrected ideal image shows a road surface having a lane defined by two perpendicular white lines (shown by intermittent black lines) L1 as shown in FIG. 4A and the actual image shows a road surface having a lane defined by two oblique white lines L2 as shown in FIG. 4B. Regions shown as cross-stripes in each image indicate the respective (16×10) pixels of the camera 1. When the ideal image and the actual image are overlapped, as shown in FIG. 4C, it will be understood that the white line L2 is deviated counterclockwise from the white line L1 by only an angle θ2. The offset detecting unit 13, therefore, rotates the actual image counterclockwise by only the angle θ2 around the center of the image as a rotational center. An image having white lines L3 as shown in FIG. 4D is, consequently, obtained. Further, as shown in FIG. 4E, the offset detecting unit 13 compares the image of FIG. 4D with the ideal image of FIG. 4A and detects that the white line L3 is deviated from the white line L1 to the right by two pixels. When the angle of view in the horizontal direction of the CCD camera 1 is equal to 64° and the number of pixels is equal to (16×10) as mentioned above, since one pixel corresponds to 4°, the rightward deviation of two pixels denotes that the camera 1 is deviated to the left by only 8°. In case of this example, consequently, the offset detecting unit 13 holds the offset amount corresponding to the rightward deviation of two pixels and supplies it to the canceling unit 2a in the image processing unit 2.

In the canceling unit 2a in the image processing unit 2, the whole image shown by the actual image signal from the CCD camera 1 is moved to the left by only the offset amount, for instance, by only two pixels in the above example. A lane detecting process is executed by the lane detecting unit 2b on the basis of the image which has been moved and corrected as mentioned above.

In the lane detecting process, a luminance level threshold value for discriminating a white line is first set and a pixel position where the luminance level is equal to or higher than the threshold value on each of horizontal lines of the moved and corrected image is determined as a white line. The luminance level threshold value for discriminating the white line can be also preset or the average value of the luminance levels of the pixels on the same horizontal line of an image which is formed by the image signal can be also used.

In the vehicle-self position and attitude detecting unit 2c in the image processing unit 2, when the running road lane sandwiched by the white lines recognized by the lane detecting unit 2a is detected, the vehicle-self position on the running lane is recognized and the attitude of the vehicle for the running lane (angle between the running lane direction and the direction of the vehicle) is detected.

The steering control amount calculating unit 14 fetches the current vehicle-self position and attitude on the running road lane shown by the output signal from the image processing unit 2 as data, calculates a target steering amount at the vehicle-self position in accordance with the data, calculates a steering control amount so that a present actual steering amount of the steering detected by a steering angle sensor (not shown) is equal to the target steering amount, and drives the steering actuator 15 in accordance with the control amount. By driving the steering actuator 15 to adjust the direction of the front wheels the vehicle can cruise within the same lane.

Since the image processing unit 2, map matching processing unit 7, straight road deciding unit 9, arithmetic operating unit 10, selecting unit 11, correction processing unit 12, and offset detecting unit 13 of the foregoing embodiment are constructed by one microcomputer, they operate synchronously with a clock which is generated from a clock generator (not shown).

Although the straight road discriminating unit 9 discriminates that the vehicle cruise along the straight road in the embodiment, the unit 9 may detect a state in which the vehicle is stopped on the straight road.

Although the road lane recognizing apparatus according to the invention is applied to the steering control system in the above embodiment, the invention can be also applied to a road lane deviation detecting apparatus for detecting that a running vehicle goes beyond either one of the right and left white lines of its running lane and is deviated from the running lane, or the like.

According to the invention as mentioned above, the existence of the vehicle on the straight road is discriminated in accordance with the current vehicle-self position detected by the vehicle-self position detecting means. When the vehicle exists on the straight road, the attitude angle showing the direction of the vehicle with respect to the longitudinal road direction at the vehicle-self position is detected. When the attitude angle is detected, the predetermined ideal image is inclined by only the attitude angle, thereby obtaining the corrected ideal image. The actual image signal from the picturing means is compared with the signal of the corrected ideal image, the image difference is used as an offset amount, the actual image is corrected only by the offset amount, and the lane position is recognized on the basis of the image shown by the corrected actual image signal. Even if the picturing means mounted on the vehicle is inclined, therefore, it is possible to obtain an actual image signal from which the inclination amount, that is, the offset amount is eliminated from the image of the road surface in front of the vehicle pictured by the picturing means. By using the actual image signal processed as mentioned above, therefore, the lane position can be accurately recognized. When the lane recognizing apparatus is used for the steering control system, the steering control amount can be accurately calculated and the automatic steering becomes accurate.

What is claimed is:

1. A road lane recognizing apparatus for recognizing a lane in a road surface image in front of a vehicle, comprising:

vehicle-self position detecting means for detecting a current vehicle-self position of said vehicle;

straight road detecting means for discriminating whether said vehicle exists at a straight part of a road or not in accordance with the current vehicle-self position detected by said vehicle-self position detecting means;

attitude angle detecting means for detecting an attitude angle showing a direction of said vehicle relative to a road direction at said vehicle-self position when the existence of said vehicle on the straight part of road is detected by said straight road detecting means;

correction processing means for generating a correction road surface image signal showing an image obtained by inclining a predetermined ideal road surface image by only said attitude angle when said attitude angle is detected;

picturing means, mounted on said vehicle, for picturing a road surface in front of said vehicle and for generating an actual road surface image signal;

offset detecting means for comparing said actual road surface image signal with said correction road surface image signal when said correction road surface image signal is generated and for holding and generating an image difference as an offset amount;

correcting means for correcting said actual road surface image signal by only said offset amount held; and lane recognizing means for recognizing a road lane position on the basis of an image shown by said actual road surface image signal corrected by said correcting means.

* * * * *